United States Patent [19]

Jamieson et al.

[11] 4,037,955
[45] July 26, 1977

[54] MICROFILM CAMERA AND PHOTOGRAPHIC FILM HANDLING APPARATUS

[75] Inventors: John Jamieson, Los Gatos; Henry F. Price, Laguna Niguel, both of Calif.

[73] Assignee: Bell & Howell Company, Chicago, Ill.

[21] Appl. No.: 536,702

[22] Filed: Dec. 26, 1974

[51] Int. Cl.² ............................................. G03B 27/32
[52] U.S. Cl. ..................................... 355/54; 354/203; 354/210; 352/79
[58] Field of Search .............. 354/203, 159, 120, 123, 354/124, 210, 214; 355/72, 95, 53, 54, 64, 65; 352/223, 225, 227, 79, 80

[56] References Cited

U.S. PATENT DOCUMENTS

| | | | |
|---|---|---|---|
| 2,282,427 | 5/1942 | Powers | 354/203 |
| 2,763,182 | 9/1956 | Urban et al. | 355/54 |
| 3,601,487 | 8/1971 | Burton et al. | 355/95 X |
| 3,627,413 | 12/1971 | Bushey et al. | 355/53 |
| 3,767,295 | 10/1973 | Gerber | 352/79 |
| 3,767,302 | 10/1973 | Roberts et al. | 355/53 |
| 3,836,932 | 9/1974 | Lohl et al. | 352/79 X |

*Primary Examiner*—L. T. Hix
*Assistant Examiner*—Alan Mathews
*Attorney, Agent, or Firm*—Benoit Law Corporation

[57] ABSTRACT

Apparatus for handling photographic film having a first format and alternatively photographic film having a second format different from the first format comprises photographic imaging equipment has a first unit including a first photographic lens system and an integral first extension for defining a first image aperture, and a second unit including a second photographic lens system and an integral second extension for defining a second image aperture. A film pressure plate clamps photographic film having the first format and photographic film having the second format alternatively against the mentioned first extension and against the mentioned second extension. A device is coupled to the film pressure plate for actuating said pressure plate relative to the first extension and alternatively relative to the second extension. These actuating means are mounted in a stationary relationship relative to equipment for releasably mounting the first unit and alternatively the second unit. Photographic film having the first format and alternatively photographic film having the second format is guided past the film pressure plate by equipment mounting on a carriage which is movable relative to the film pressure plate. Film guiding means include a film guide base on the carriage in the vicinity of the film pressure plate and two exchangeable film guide units for guiding, respectively, film having the first format and film having the second format.

6 Claims, 9 Drawing Figures

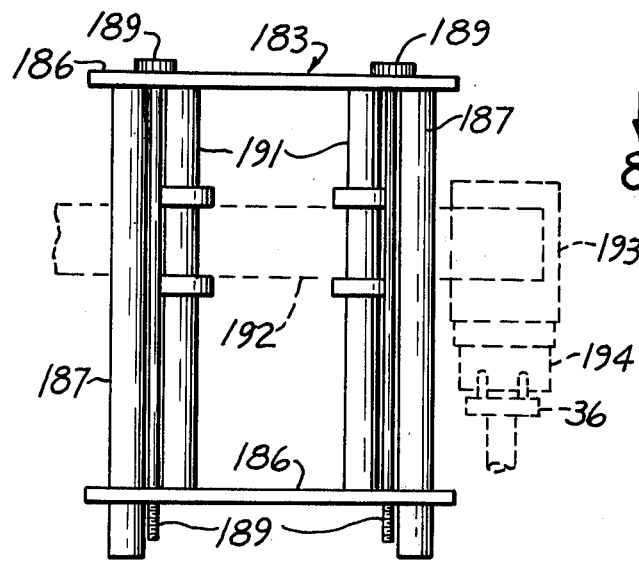
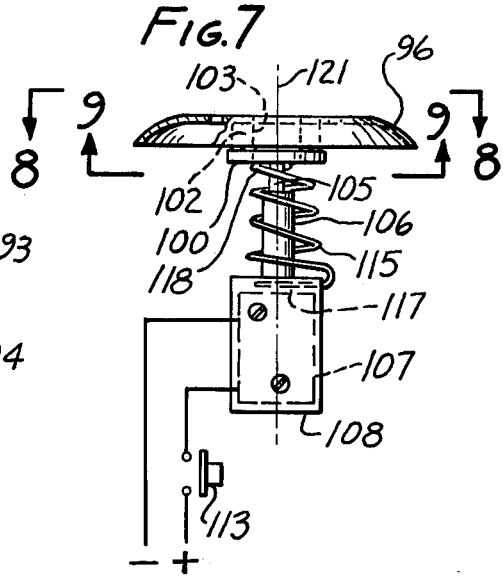
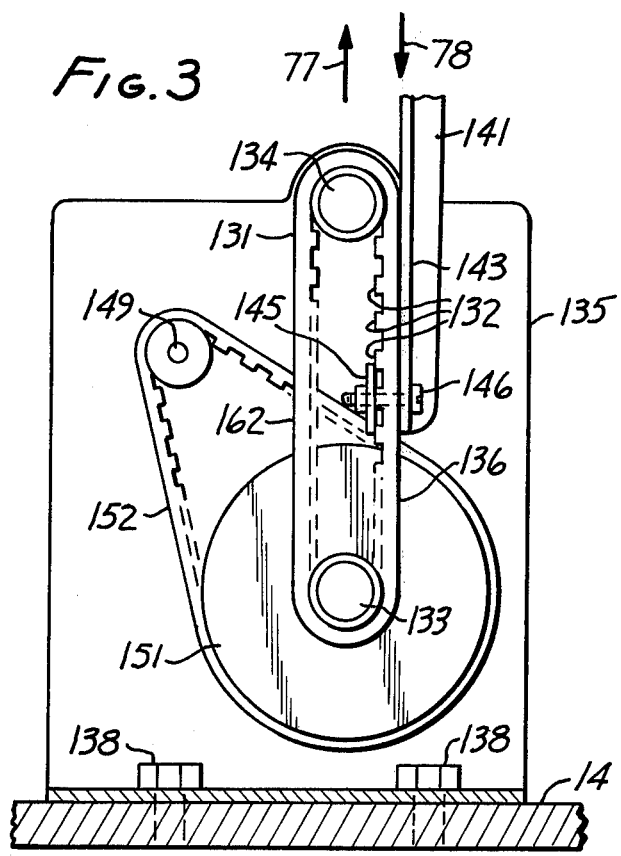
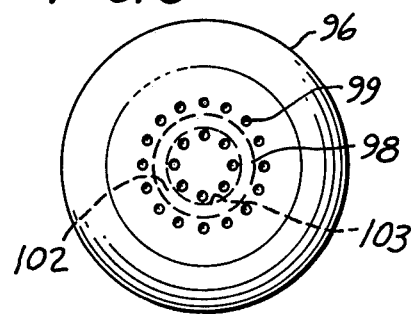
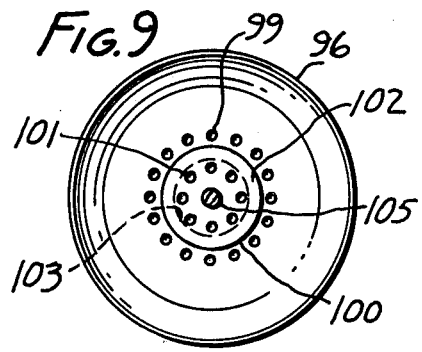

MICROFILM CAMERA AND PHOTOGRAPHIC FILM HANDLING APPARATUS

BACKGROUND OF THE INVENTION

1. Field of the Invention

The subject invention relates to photographic equipment and, more specifically, to microfilm cameras and other film handling apparatus.

2. Prior-Art Background

Modern data storage and retrieval relies increasingly on microfilm recording of the data. Microfilm recording, including microfiche techniques, drastically reduces required storage space for the data and renders the recorded data easily accessible and retrievable.

In the field of data processing, progress in the microfilm area has been stifled for a long time by a lack of microfilm cameras which in terms of accuracy, precision and film handling capability would be up to the attainable speed and resolution of cathode ray tube systems and other computer or data processor readout equipment.

Developments in this field in recent years have led to enormously complex and expensive camera systems, many of which fell short of even approaching the potentialities of electronic computers and other data processors.

In particular, the provision of equipment for high-speed and high-precision film positioning at the image aperture continues to be a problem, especially at the extremely short focal lengths prevalent in the microimaging art.

A persistent aspect of the latter problem concerns the lack of adequate film format exchange equipment that would be adapted in terms of attainable speed of exchange to the requirements of data processing systems and that, at the same time, would be characterized by an economy of parts.

While emphasis has so far been placed herein on the requirements of microfilm cameras in data processing systems, it is to be understood that various aspects of the subject invention also have utility in other microfilm apparatus or even in areas of the broad field of film handling equipment.

SUMMARY OF THE INVENTION

It is broadly an object of the invention to overcome each of the above mentioned disadvantages.

It is a related object of the invention to provide improved photographic film handling equipment.

It is a similar object of this invention to provide improved microfilm camera equipment.

It is a related object of this invention to provide improved microfilm cameras adapted to the needs of computer and other data processing systems.

It is a further object of this invention to provide microfilm cameras or other film handling equipment having improved film format exchange facilities.

Other objects of the invention will become apparent from the further course of this disclosure.

The subject invention resides in apparatus for handling photographic film having a first format and alternatively photographic film having a second format different from the first format and, more specifically, resides in the improvement comprising, in combination, photographic imaging equipment comprising a first unit including a first photographic lens system and first means operatively associated with said first lens system for defining a first image aperture, and a second unit including a second photographic lens system and second means operatively associated with said second lens system for defining a second image aperture, means for releasably mounting said first unit and alternatively said second unit, a film pressure plate operatively associated with said imaging equipment and common to said first aperture defining means and said second aperture defining means for clamping photographic film having said first format and photographic film having said second format alternatively against said first aperture defining means and against said second aperture defining means, means coupled to said film pressure plate for actuating said film pressure plate relative to said first aperture defining means and alternatively relative to said second aperture defining means, means connected to said actuating means for mounting said actuating means in a stationary relationship relative to said means for releasably mounting said first unit and alternatively said second unit, means for advancing photographic film having said first format and alternatively photographic film having said second format past said film pressure plate, a carriage for mounting said advancing means for movement relative to said film pressure plate and said means for releasably mounting said first unit and alternativey said second unit, means coupled to said carriage for moving said carriage relative to said film pressure plate and said means for releasably mounting said first unit and alternatively said second unit, and means for alternatively guiding said advancing film having said first format and said advancing film having said second format in between said film pressure plate and said first aperture defining means and alternatively said second aperture defining means, said guiding means including a film guide base on said carriage in the vicinity of said film pressure plate and two exchangeable film guide units for guiding, respectively, film having said first format and film having said second format, one of said film guide units comprising first film guide members for guiding film having said first format and means for releasably attaching said first film guide members to said film guide base, and the other of said film guide units comprising second film guide members for guiding film having said second format and means for releasably attaching said second film guide members to said film guide base.

BRIEF DESCRIPTION OF THE DRAWINGS

The invention and its aspects and objects will become more readily apparent from the following detailed description of preferred embodiments thereof, illustrated by way of example in the accompanying drawings, in which like reference numerals designate like or functionally equivalent parts, and in which:

FIG. 3 is a side view taken on the line 3—3 of FIG. 2, of a belt drive system employed in the apparatus of FIGS. 1 and 2;

FIG. 4 is an elevation of a film guide unit which may be employed in the apparatus of FIGS. 1 and 2;

FIGS. 5 and 6 are rear elevations of optical units that may be employed in the apparatus of FIGS. 1 and 2;

FIG. 7 is a side view of a film clamping device taken on the line 7—7 in FIG. 1;

FIG. 8 is a front view of the film clamping device of FIG. 7, taken on the line 8—8 of FIG. 7; and FIG. 9 is a rear view of an element of the film clamping device taken on the line 9—9 of FIG. 7.

DESCRIPTION OF PREFERRED EMBODIMENTS

Figure 1:
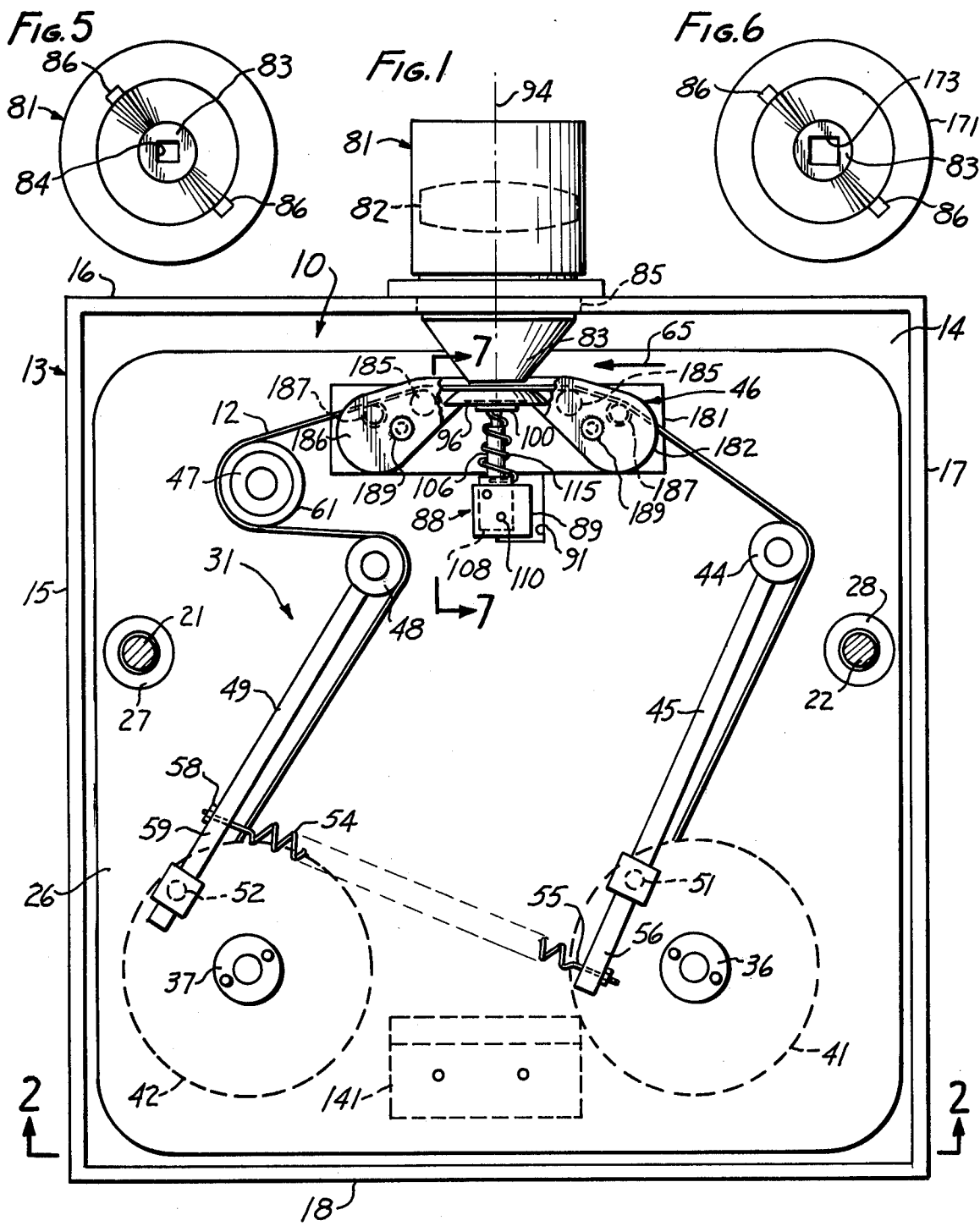
FIG. 1 is a plan view of a microfilm camera in accordance with a preferred embodiment of the subject invention.

The drawings illustrate a camera 10 and associated equipment for photographing information on microfilm. Typically, the illustrated camera will be employed for photographing pictorially displayed information from a cathode ray tube of a computer or data processor (not shown) onto microfilm 12. It is, however, to be understood that the illustrated equipment may also be employed for other types of microfilm cameras or even for various types of photographic film handling equipment, as may become apparent to those skilled in the art from the subject extensive disclosure.

The camera 10 has a light-tight housing 13 comprising a bottom 14 (see FIG. 2) and four side walls 15, 16, 17 and 18 (see FIGS. 1 and 2) joined to or integral with the bottom 14. A light-tight removable cover 19, shown only in FIG. 2, completes the camera housing 13.

A pair of upright posts or stanchions 21 and 22 arise from the camera bottom 14 and are attached thereto at 23 and 24. The stanchions 21 and 22 guide a carriage 26 having longitudinal or sleeve bearings 27 and 28 attached thereto. The stachion 21 extends through the carriage bearing 27 and the stanchion 22 extends through the carriage bearing 28.

A film transport 31 is located on the carriage 26.

Figure 2:
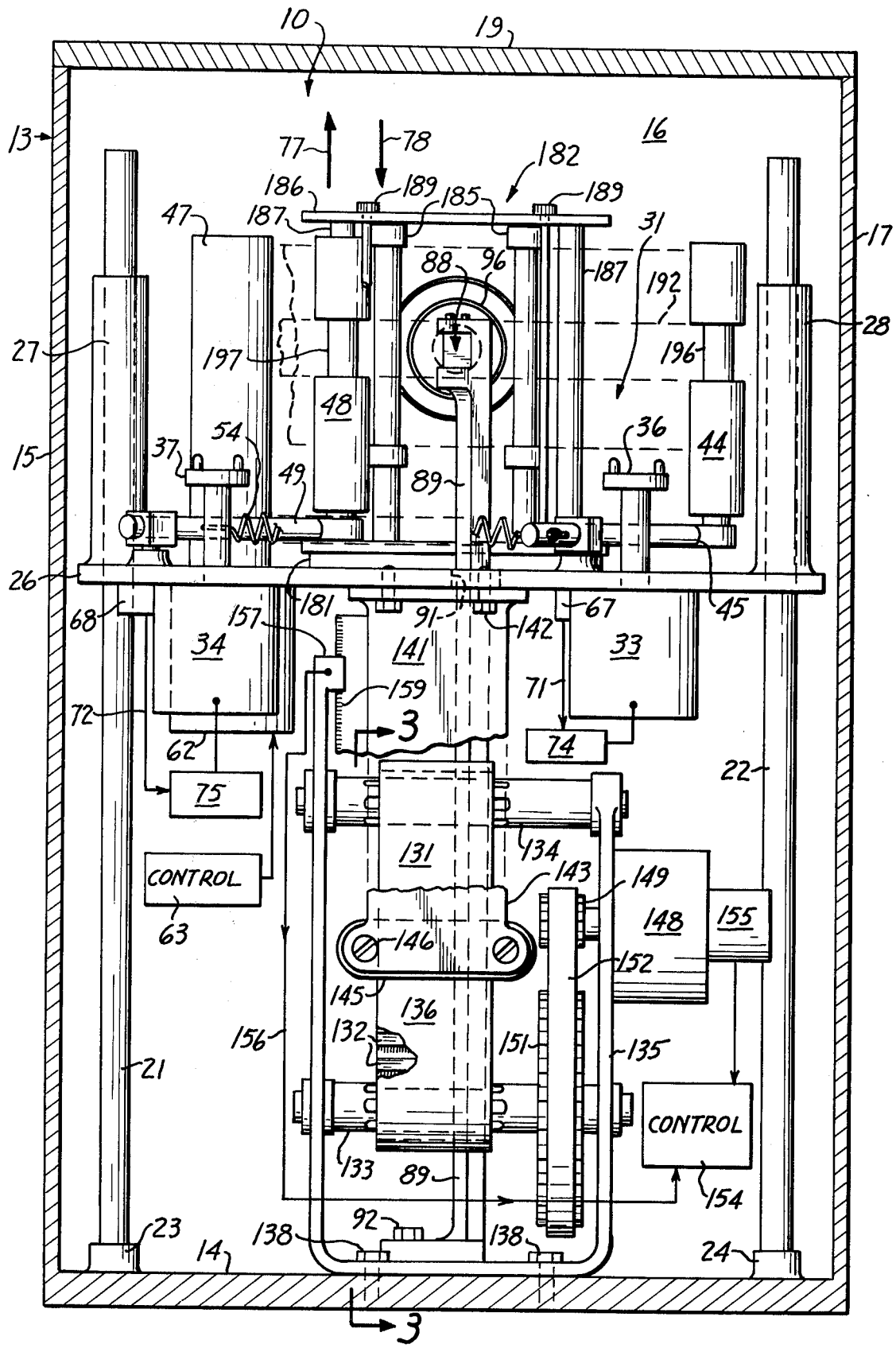
FIG. 2 is an elevation taken on the line 2—2 in FIG. 1.

The film transport 31 is part of a film advance drive assembly including a film supply reel drive motor 33 and a film takeup reel drive motor 34, both attached to the carriage 26 at the underside thereof as seen in FIG. 2.

When energized, the motor 33 rotates a supply reel drive member 36 and the motor 34 rotates a takeup reel drive member 37. To avoid crowding of the drawings, no film reels or similar devices have been shown in FIGS. 1 and 2 on the members 36 and 37. However, it is to be understood that the illustrated equipment may be employed with, or readily adapted to, any suitable conventional film reel or cartridge which may be reasonably accommodated within the confines of the camera housing 13. Accordingly, film supply and takeup reels or cartridges are only shown symbolically by dotted circles at 41 and 42 in FIG. 1.

The microfilm 12 extends from the reel 41 to an idler roller 44 of a first tension arm 45, across a film guide unit 46, over a capstan 47, to an idler roller 48 of a second tension arm 49, and to the takeup reel 42.

The tension arms 45 and 49 are pivoted at 51 and 52 respectively and form loops of varying size between the reel 41 and film guide unit 46 and between the capstan 47 and reel 42. It is a main function of the tension arms 45 and 49 to equalize the tension across the capstan 47 so that the film may be driven without the need of the conventional nip roller at the capstan. To this end, the film 12 is wrapped around the capstan 47 in a 150° to 200° wrap and tension arms 45 and 49 are interconnected by a helical spring 54 having a first end 55 attached to a portion 56 of the first tension arm situated beyond the pivot 51 as seen from the idler roller 44, and having a second end 58 attached to a portion 59 of the second tension arm located on the same side of the pivot 52 as the idler roller 48.

This "across the pivots" spring bias has been found to promote an excellent tension equalization of the film across the capstan 47 for a rapid and slip-free traction of the film by the capstan. That traction may be further increased in a conventional manner by equipping the capstan 47 with an outer sleeve 61 of rubber or another elastomer.

The capstan 47 is driven by a capstan motor 62 which is attached to the carriage 26. The capstan motor 62 may be energized by a control drive 63. That control drive is not particularly illustrated since it does not form part of the subject invention and since capstan drive controls are well known in the specialized film drive and magnetic recording drive arts. The chief purpose of the film drive is to advance the film in a controlled manner in a first direction indicated by the arrow 65.

The angular position of the tension arms 45 and 49 controls in a conventional manner the energization of the reel drive motors 33 and 34. To this end, the tension arms 45 and 49 actuate angular position pick-up devices 67 and 68.

The pick-up devices 67 and 68 may be of a variable resistor or photoelectric type providing in lines 71 and 72 signals corresponding to the angular position of the tension arms 45 and 49, respectively. The signal indicative of the angular position of the tension arm 45 is applied by the line 71 of a control 74 which accordingly varies the energization of the reel motor 33.

Similarly, the signal indicative of the angular position of the tension arm 49 is applied by the line 72 to a control 75 which accordingly varies the energization of the reel drive motor 34. Again, the controls 74 and 75 are not particularly illustrated, since their nature and function are well known in the art of specialized film drives the magnetic recording tape transports. In brief, as the loop of film between the reel 41 and the film guide unit 46 decreases, the pick-up 67 and control 74 will cause the drive 33 to issue more film from the reel 41. Conversely, if the size of the loop between the capstan 47 and the reel 42 increased, the pick-up 68 and control 75 will cause the reel drive 34 to increase the takeup of film on the reel 42.

The stanchions 21 and 22 and the longitudinal or axial bearings 27 and 28 cooperate in restricting movement of the carriage 26 to movement in parallel second and third directions being opposed to each other. In FIG. 2, these directions are indicated by the arrows 77 and 78 and it will be noted that, in the case of the apparatus shown in FIGS. 1 and 2, the direction 77 is an up direction while the direction 78 is a corresponding opposite down direction. The directions 77 and 78 both extend at right angles to the direction of film movement 65 imposed by the film drive of the transport 31 on the carriage 26. It will thus be noted that the combination of the film drive including the transport 31 on the carriage 26 and the carriage 26 itself with the equipment for driving it, more fully described below, cooperate in placing any desired portion of the film 12 at the image aperture presently to be described of an optical unit 81.

The optical unit 81 shown in FIGS. 1 and 5 includes a photographic lens system symbolically shown at 82 and an integral extension 83 defining an image aperture 84. The upright wall 16 of the housing 13 has an aperture 85 for receiving the optical unit 81 at the extension 83. Part of a releasable bayonet attachment is shown at 86 in FIG. 5, it being understood that a corresponding bayonet socket (not shown) is provided in or at the housing wall 16, whereby to provide a means for releasably mounting the optical unit 81 on the camera 10.

The camera further includes a device for selectively clamping microfilm 12 against the optical unit extension 83 adjacent the image aperture 84. The clamping device 88 is mounted on an upright bracket or stanchion 89 which extends through an aperture 91 in the carraige 26 and which is fastened to the camera base plate or bottom at 92. In this manner, the stanchion 89 mounts the film clamping device 88 against lateral movement relative to an optical path 94 along which an image of the input information is projected by the lens system 82 through the image aperture 84.

The clamping device 88 includes a film pressure plate 96. In accordnce with the preferred embodiment illustrated in FIGS. 1, 2, 7, 8 and 9, the film pressure plate is circular and is laterally dished for maximum protection of the film 12 during rapid advancement and clamping.

Prior-art equipment of the subject type was burdened with extreme tolerance problems stemming from a carriage-mounted image aperture and film pressure plate. According to the subject invention, these problems are eliminated by the stationary or fixed aperture 84 or 173 and pressure plate 96, thereby relieving the carriage design of extreme tolerance problems.

By way of example, the circular pressure plate 96 may be formed of a light metal, such as aluminum which may be anodized.

As best seen in FIG. 8, the film pressure plate 96 has a cluster of air holes 98, as well as a circular air hole arrangement 99 for an escape of air from space between the film pressure plate 96 and adjacent microfilm 12. In practice, this has been found an important feature of the illustrated preferred embodiment of the invention, since it eliminates prior-air blurring or defocusing effects attributable to the formation of an air cushion or a shock wave between the pressure plate and the film when the pressure plate rapidly clamped the film against the optical unit extension 83 at the aperture 84.

The clamping device 88 further includes a mounting plate 100 having a further cluster of air holes 101 corresponding to the cluster 98 in the film pressure plate. A washer-shaped member 102 of rubber or another elastic or elastomeric material is disposed between and connects the film pressure plate 96 to the mounting plate 100. The member 102 is preferably circular and may be connected to the film pressure plate 96 and mounting plate 100 by an adhesive substance. The elastic member 102 has an aperture 103 communicating with the air hole clusters 98 and 101.

In this manner, air can escape and enters through the film pressure plate 96, mounting plate 100 and elastic interconnecting member 102. In addition, the elastic member 102 cushions or absorbs shock loads which would otherwise affect the film.

The mounting plate 100, in turn, is mounted on a reduced diameter portion 105 of a ferromagnetic movable armature or plunger 106. The plunger 106 extends into a solenoid 107 having a stationary armature 108.

The solenoid 107 and stationary armature 108 are connected to the stanchion or mounting bracket 89 by screws or other fasteners 110. In this manner, the clamping device actuator represented by the solenoid 107 and armature 108 is maintained stationary relative to the wall 16, optical unit extension 83 and image aperture 84, independently of the movement of the carriage 26.

The solenoid 107 develops a magnetic force which attracts the plunger 106 to the stationary armature 108 upon closure of a normally open switch 113, which connects the solenoid to a source of electric power, symbolized by plus and minus signs.

In this manner, the film pressure plate 96 is moved away from the aperture 84 for a release of the film 12 between the optical unit extension 83 and film pressure plate 96.

During the actuation of the switch 113, film 12 may thus be advanced by the transport 31 between the film pressure plate and the aperture 84.

Upon release of the switch 13, the film pressure plate 96 is rapidly advanced by a helical spring 115 toward the image aperture 84 and microfilm 12 is then clamped against the optical unit extension 83. An image of the input information from a cathode ray tube or other input device (not shown) is then projected by the lens system 82 through the image aperture 84 onto the photographic film 12. Because of the action of the film pressure plate 96, an excellent positioning of the microfilm 12 at the image aperture 84 is realized.

The actuator spring 115 which biases the film pressure plate toward the image aperture defining extension 83 has a first end 117 retained stationary relative to the film pressure plate by the stationary clamping device armature 108.

The clamping device biasing spring 115 has a second end 118 which extends around the reduced diameter portion 105 of the solenoid plunger 106 in a lost-motion connection. On the one hand, this allows the film pressure plate 96 a certain lost-motion travel relative to the spring end 118 and the stationary solenoid armature 108. On the other hand, the spring 115, through its second end 118, will restrain the film pressure plate 96 from further outward motion at the end of the lost-motion travel.

In practice, these are important features of the illustrated preferred embodiment, since they prevent malfunction of, and damage to, the equipment both when the optical unit 81 is inserted in the camera and when the same is removed so that the bias spring 115 would tend to urge the film pressure plate outwardly as seen from the stationary armature 107. As another important feature of the illustrated preferred embodiment, the solenoid plunger 106 is free of lateral restraint whereby the film pressure plate 96 is mounted for rotary motion about an axis 121 which is perpendicular to a circular surface of the film pressure plate, as best seen in FIG. 7. This ability to carry out a rotary motion prevents the film pressure plate from becoming stuck in any angular position and from exerting an uneven load on the microfilm 12.

Where necessary, the optical unit 81 may include a camera shutter (not shown), which may be of a conventional type. A shutter may, however, be dispensed with if an electronic shutter action results from an appropriate and conventional energization of the cathode ray tube or other display device (not shown) from which the lens system 82 projects the input image of the camera 10.

The switch 113 may be replaced by an electronic switching device or circuit for rapid actuation of the film pressure plate 96.

Such an electronic switching device or circuit would not be part of the subject invention and is thus not illustrated in the drawings.

The drive of the carriage 26 which drives this carriage with bearings 27 and 28 selectively up and down the stanchions 21 and 22 in the direction of the arrows 77 and 78 includes an endless timing belt 131 having a plurality of teeth 132 located at the inside thereof in an endless arrangement as seen in FIG. 3. Timing belts as such are well known in the art of servo mechanisms.

As shown in FIGS. 2 and 3, a pair of toothed pinions 133 and 134 are rotatably mounted in spaced relationship by a frame 135 and cooperate in mounting the timing belt 131 in an endless top having a straight portion 136 extending parallel to the above mentioned opposed directions of carriage movement 77 and 78. The frame 135 is attached to the base or bottom plate 14 of the camera housing at 138.

A bracket 141 is attached to the carriage 142 and serves as a means for transmitting motive power from the timing belt 131 to the carriage 26. To this end, the bracket 141 has a straight portion 143 extending parallel to the opposed directions of carriage movement 77 and 78 and to the straight portion 136 of the timing belt 131. The free end of the power transmitting bracket 141 is attached to the timing belt 131 at the straight belt portion 136 by fastening devices 145 and 146.

An electric motor 148 drives the timing belt 131 in a first sense for movement of the carriage 26 in the direction 77 and alternatively in an opposite second sense for movement of the carriage in the direction 78. To this end, the motor 148 rotates a pinion 149 which, in turn, drives a gear wheel 151 via an endless time belt 162. The gear wheel 151 is attached to or integral with the pinion 133.

The carriage drive motor 148 may be energized and controlled in any desired manner. For instance, the motor 148 may be energized by a control 154 which varies the energization of the motor 148 in response to a first signal provided by a tachometer 155 driven by the motor 148 and a second signal supplied via a line 156 by a carrage position sensing device 157. The tachometer 115, as well as the position sensing device 157, may be of a conventional type. For instance, the position sensing device 157 may include a photocell pick-up (not shown) which senses the position of the carriage 26 by means of an analog gray scale or digital line raster device 159 attached to the power transmitting bracket 141.

The carriage drive according to the subject invention and its preferred embodiments has been found very accurate and reliable in positioning the carriage 26 rapidly and with great precision. In the illustrated preferred embodiment, both elongate sides 136 and 162 of the timing belt 136 are parallel to the opposed directions 77 and 78 for a tighter control of the carriage positioning process without any objectionable play.

Also, all portions of the endless timing belt 131 are at all times located to one side of the carriage 26 for all positions of the carriage. This distinguishes itself favorably from prior-art carriage drives wherein a drive belt or cable extended on both sides of the carriage, thereby giving rise to objectionable play or lost motion.

The illustrated camera 10 is also characterized by a rapid and convenient adaptability to various film formats. Of primary interest in this respect are the 16mm microfilm format and the 105mm microfiche format. To serve these two formats, the illustrated camera not only includes the above mentioned optical unit 81 shown in FIGS. 1 and 5, but also a similar optical unit 171 shown in FIG. 6.

The optical unit 171 is exchangeable on the camera with the optical unit 81 and, for that purpose, also includes the bayonet socket locking devices 86. The optical unit 171 also has an integral extension 83 for defining an image aperture. The image aperture 173 defined by the latter extension has a different format than the image aperture 84 of the optical unit 81, corresponding to differences in image size and format between the two optical units 81 and 171.

The film clamping device 88 with film pressure plate 96 is common to the optical unit 81 and 171 as either is releasably mounted on the camera wall 16. Because of the stationary mounting of the armature 108 of the film clamping device 88 by the mounting bracket or stanchion 89, one and the same film pressure plate and clamping device may be used for all formats handled by the microfilm camera 10.

This dispenses with the prior-art necessity of having to exchange film pressure plates for different film formats. Also, it will be noted that the illustrated stationary mounting of the clamping device and the circular configuration of the film pressure plate 96 keeps the mass of the film pressure plate at a minimum for rapid and arcuate actuation at a minimum of motive power.

The illustrated microfilm camera also includes facilities for alternatively guiding a film having a first format (e.g., 105mm) and a film having a second format (e.g., 16mm) in between the film pressure plate 96 and the aperture defining structure 83 of either of the optical units 81 and 171. In this respect, it is to be understood that neither of the optical units 81 and 171 is necessarily restricted to a specific film format. Rather, the optical units 81 and 171 may be designed in a conventional manner so as to be usable with either film format. For instance, one of the units 81 and 171 may have a 24× lens system and the other of these units may have a 42× lens system.

The film format exchange facilities of the illustrated preferred camera embodiment include a film guide base 181 located on the carriage 26 in the vicinity of the film pressure plate 96, and two exchangeable film guide units 182 shown in FIGS. 1 and 2 and 183 shown in FIG. 4 for guiding, respectively, film having the mentioned first format (e.g., 105mm) and film having the mentioned second format (16mm).

The film guide unit 182 includes cylindrical film guide members 185 mounted in a frame 186 comprising cylindrical posts 187 which may be insertable into corresponding holes (not shown) of the film guide base 181.

The film guide unit 182 includes two manually actuable elongate screws 189 which releasably anchor the unit 182 to the film guide base 181. The configuration of the cylindrical film guide members 185 is adapted to the first film format.

The film guide unit 183 shown in FIG. 4 is closely similar to the film guide unit 182 so that like reference numerals are employed to designate like or functionally equivalent parts. Instead of the cylindrical film guide members 185 of the unit 182, the unit 182 has cylindrical film guide members 191, the configuration of which is adapted to the second or 16mm film format shown in dotted lines at 192. As also shown in dotted outline in FIG. 4 at 193 and 194, respectively, the second format or 16mm film may be dispensed from a cartridge customary with that format and the reel drive member 36 may be equipped with an adaptor 194 for accommodating that cartridge. The tension arm rollers 44 and 84 have cylindrical cutouts 196 and 197 for accommodating the smaller film format.

The obvious ease with which the film guide units 182 and 183 are mutually exchanged greatly augments the format adaptability of the illustrated camera in terms of speed and operating convenience.

We claim:

1. In apparatus for handling photographic film having a first format and alternatively photographic film having a second format different from said first format, the improvement comprising in combination:

photographic imaging equipment comprising a first unit including a first photographic lens system and first means operatively associated with said first lens system for defining a first image aperture, and a second unit including a second photographic lens system and second means operatively associated with said second lens system for defining a second image aperture;

means for releasably mounting said first unit and alternatively said second unit;

a film pressure plate operatively associated with said imaging equipment and common to said first aperture defining means and said second aperture defining means for clamping photographic film having said first format and photographic film having said second format alternatively against said first aperture defining means and against said second aperture defining means;

means coupled to said film pressure plate for actuating said film pressure plate relative to said first aperture defining means and alternatively relative to said second aperture defining means;

means connected to said actuating means for mounting said actuating means in a stationary relationship relative to said means for releasably mounting said first unit and alternatively said second unit;

means for advancing photographic film having said first format and alternatively photographic film having said second format past said film pressure plate;

a carriage for mounting said advancing means for movement relative to said film pressure plate and said means for releasably mounting said first unit and alternatively said second unit;

means coupled to said carriage for moving said carriage relative to said film pressure plate and said means for releasably mounting said first unit and alternatively said second unit; and means for alternatively guiding said advancing film having said first format and said advancing film having said second format in between said film pressure plate and said first aperture defining means and alternatively said second aperture defining means, said guiding means including a film guide base on said carriage in the vicinity of said film pressure plate and two exchangeable film guide units for guiding, respectively, film having said first format and film having said second format, one of said film guide units comprising first film guide members for guiding film having said first format and means for releasably attaching said first film guide members to said film guide base, and the other of said film guide units comprising second film guide members for guiding film having said second format and means for releasably attaching said second film guide members to said film guide base.

2. Apparatus as claimed in claim 1, wherein: said film pressure plate is circular.

3. Apparatus as claimed in claim 1, wherein: said film pressure plate has a cluster of air holes for an escape of air from a space between said film pressure plate and adjacent photographic film.

4. In apparatus for handling photographic film having a first format and alternatively photographic film having a second format different from said first format, the improvement comprising in combination:

a housing;

photographic imaging equipment comprising a first unit including a first photographic lens system and having an integral first extension defining a first image aperture, and a second unit including a second photographic lens system and having an integral second extension defining a second image aperture different from said first aperture;

means for releasably mounting said first unit and alternatively said second unit on said housing;

a film pressure plate operatively associated with said imaging equipment and common to said first extension and said second extension for clamping photographic film having said first format and photographic film having said second format alternatively against said first extension and against said second extension;

means coupled to said film pressure plate for actuating said film pressure plate relative to said first extension and alternatively relative to said second extension;

means connected to said actuating means for mounting said actuating means in a stationary relationship relative to said means for releasably mounting said first unit and alternatively said second unit;

means for advancing photographic film having said first format and alternatively photographic film having said second format past said film pressure plate;

a carriage for mounting said advancing means for movement relative to said film pressure plate and said means for releasably mounting said first unit and alternatively said second unit;

means coupled to said carriage for moving said carriage relative to said film pressure plate and said means for releasably mounting said first unit and alternatively said second unit; and means for alternatively guiding said advancing flm having said first format and said advancing film having said second format in between said film pressure plate and said first extension and atlernatively said second extension, said guiding means including a film guide bse on said carriage in the vicinity of said film pressure plate and two exchangeable film guide units for guiding, respectively, film having said first format and film having said second format, one of said film guide units comprising first film guide members for guiding film having said first format and means for releasably attaching said first film guide members to said film guide base, and the other of said guide units comprising second film guide members for guiding film having said second format and means for releasably attaching said second film guide members to said film guide base.

5. Apparatus as claimed in claim 4, wherein: said film pressure plate is circular.

6. Apparatus as claimed in claim 4, wherein: said film pressure plate has a cluster of air holes for an escape of air from a space between said film pressure plate and adjacent photographic film.

* * * * *